Jan. 25, 1966   J. G. VAN SANTEN   3,231,744
FAST-SWITCHING, BISTABLE ELECTRO-OPTICAL DEVICE
Filed Nov. 14, 1961

INVENTOR
JOHANNES G. VAN SANTEN
BY
AGENT

United States Patent Office 3,231,744
Patented Jan. 25, 1966

3,231,744
FAST-SWITCHING, BISTABLE ELECTRO-
OPTICAL DEVICE
Johannes Gerrit van Santen, Emmasingel, Eindhoven,
Netherlands, assignor to North American Philips Company, Inc., New York, N.Y., a corporation of Delaware
Filed Nov. 14, 1961, Ser. No. 152,295
Claims priority, application Netherlands, Nov. 22, 1960,
258,241
7 Claims. (Cl. 250—209)

The invention relates to an electro-optical, bistable device comprising a circuit arrangement composed of a first parallel combination of two branches, of which one includes a first radiation element and the other includes a first photo-conductive element, and a second parallel combination of two branches, of which one includes a second radiation element and the other includes a second photo-conductive element, these parallel combinations being connected in series with each other and with a voltage supply source, while the first radiation element is optically coupled with the second photo-conductive element and the second radiation element is optically coupled with the first photo-conductive element, and with a third radiation element coupled optically with the first photo-conductive element.

Such a device, a flipflop, is known; see Philips Research Reports 15, 368–389; it comprises three states of equilibrium, of which two are stable states and one is an unstable state. In one state the current passes through the first radiation element and the second photo-conductive element and in the other stable state the current passes through the first photo-conductive element and the second radiation element. In the unstable state half of the current passes along one path and half of the current along the other path, while the voltage across the two parallel combinations is the same. If the flipflop is in the unstable state, a small increase in voltage across the first radiation element will cause this element to emit more light than the second radiation element, so that the resistance of the second photo-conductive element drops below the resistance of the first photo-conductive element. Consequently, the voltage difference between the first and the second parallel combinations is increased and finally subsequently the whole voltage will be operative across the first parallel combination, so that a state of equilibrium prevails in the voltage distribution among the first radiation element and the second photo-conductive element and the resistance value of the second photo-conductive element owing to the incident light from the radiation element driven at the partial voltage concerned. In practice such a flipflop will therefore always assume one of the stable states. The value of the maximum partial voltage operative across the radiation element of such a device and hence the value of the voltage supplied by the voltage source is determined by the break-down voltage of the radiation elements. The maximum partial voltage operative across a radiation element is, of course, required to be lower than the breakdown voltage of the element. The device is controlled by a third radiation element coupled optically with the first photo-conductive element the radiation of which element causes the current to pass through the first photo-conductive element and the second radiation element. In order to switch the flipflop back into the initial state, a fourth radiation element may be provided, which is optically coupled with the second photo-conductive element whose radiation causes the current to pass through the first radiation element and the second photo-conductive element.

The term "photo-conductive element" is to denote herein an element of which the electrical impedance is varied by a suitable electro-magnetic or corpuscular radiation incident on the element, for example by a variation in the resistance or the capacity, the initial value of the impedance being restored after this radiation has disappeared. The electro-magnetic radiation may lie in the visible part of the spectrum, but a suitable radiation is also that of a longer or shorter wavelength, for example infrared radiation or X-rays. The intensity of the emitted radiation of the radiation element depends upon the supplied electrical energy. The emitted radiation may be produced by electrically heating a solid substance, for example an incandescent wire or by a gas discharge. The radiation element may also be an electro-luminescent element, and electro-photo-luminescent element or a different type of element having a luminescent solid substance. The radiation element is preferably formed by an electro-luminescent element, since an electro-luminescent element and a photo-conductive element can be combined in a simple manner to form a unit, which can be handled easily.

Since the flipflop is usually controlled by the output radiation or voltage of a similar flipflop, the third radiation element may be considered to be a radiation element of a similar flipflop or to be a radiation element fed by the voltage operative across the radiation element of a similar flipflop. It has been found that, since the radiation elements and the controlling radiation elements associated with the flipflop arrangement are driven by voltages of equal amplitudes and frequencies, the speed of driving or switching speed of a flipflop is restricted; the third radiation element, the fourth radiation element, if provided are required to operate for a time sufficient for producing a higher current through the elements of the flipflop arrangement, which were substantially idle up to that instant, than is produced by the second or first radiation element. In the device according to the invention, the time required to produce the higher current is reduced to a value between one third and one seventh that of the prior art device, and thus the switching speed is correspondingly increased.

In accordance with the invention the device is constructed so that at the occurrence of the same voltage across the branch including the first radiation element and across the third radiation element, the conductivity of the first photo-conductive element varies more strongly than the conductivity of the second photo-conductive element. If the device is, moreover, controlled by a fourth radiation element, coupled optically with the second photo-conductive element, the device according to the invention is then preferably constructed so that at the occurrence of the same voltage across the branch including the second radiation element and across the fourth radiation element, the conductivity of the second photo-conductive element varies more strongly than the conductivity of the first photo-conductive element.

A difference in the variations of conductivities of the photo-conductive elements may be produced by using a larger emissive surface of the third radiation element than the emissive surface of the first radiation element, or, conversely, reducing the emissive surface of the first radiation element. If a fourth radiation element is provided for control purposes, the emissive surface of the fourth radiation element is chosen larger than the emissive surface of the second radiation element. A difference in the variations of conductivities of the photo-conductive elements may be obtained, as an alternative, by providing a radiation absorbing medium between the first radiation element and the second photo-conductive element and between the second radiation element and the first photo-conductive element. Particularly, the controlling radiation element may serve as a radiation absorbing medium. It is in this case particularly advantageous to build up the device with electro-luminescent elements. In this case, the two conductive layers of the third radiation element and of the fourth radiation element must be pervious to the radiation emitted by the second and the first radiation elements.

In a further embodiment the difference in the variations of conductivities of the pohto-conductive elements is obtained by utilizing the fact that the sensitivity of a photo-conductive element depends upon the wavelength of the incident radiation. The emission spectra of the first and of the third radiation elements are then such that the first photo-conductive element is more sensitive to the radiation of the third radiation element than the second photo-conductive element is sensitive to the radiation of the first radiation element. If a fourth radiation element is provided for control purposes, particularly the emission spectra of the second and of the fourth radiation elements are such that the second photo-conductive element is more sensitive to the radiation of the fourth radiation element than the first photo-conductive element is sensitive to that of the second radiation element.

In a still further embodiment the difference in the variations of the conductivties of the photo-conductive elements is obtained by including in the branch of the first radiation element a resistor connected in series with this element to reduce the voltage across it and thus its brightness, and by including in the branch of the second radiation element a resistor connected in series with this element for a similar purpose.

The invention will now be described with reference to the drawing, which shows a few embodiments.

FIG. 1 of the drawing shows diagrammatically an electro-optical flipflop arrangement.

Figure 1:
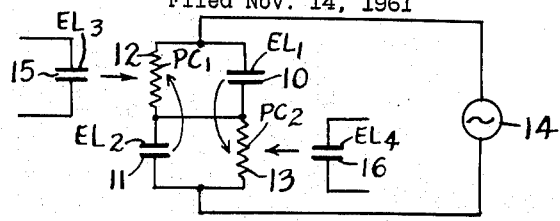

FIG. 1 shows diagrammatically an electro-optical flip-flop arrangement. It comprises the electro-luminescent elements 10 and 11 and the photo-conductive elements 12 and 13. The electro-luminescent element 10 and the photo-conductive element 12 constitute the first parallel combination and the electro-luminescent element 11 and the photo-conductive element 13 constitute the second parallel combination. They are connected in series with each other and with an alternating-voltage source 14. The electro-luminescent element 10 is optically coupled with the photo-conductive element 13, and the electro-luminescent element 11 with the photo-conductive element 12. This device is controlled by the electro-luminescent element 15, coupled optically with the photo-conductive element 12 and by the electro-luminescent element 16, coupled optically with the photo-conductive element 13. The optical couplings are indicated in the figure by arrows. The electro-luminescent elements 15 and 16 are elements of analogous arrangements or they are connected in parallel with a parallel combination of such arrangements.

Figure 2:
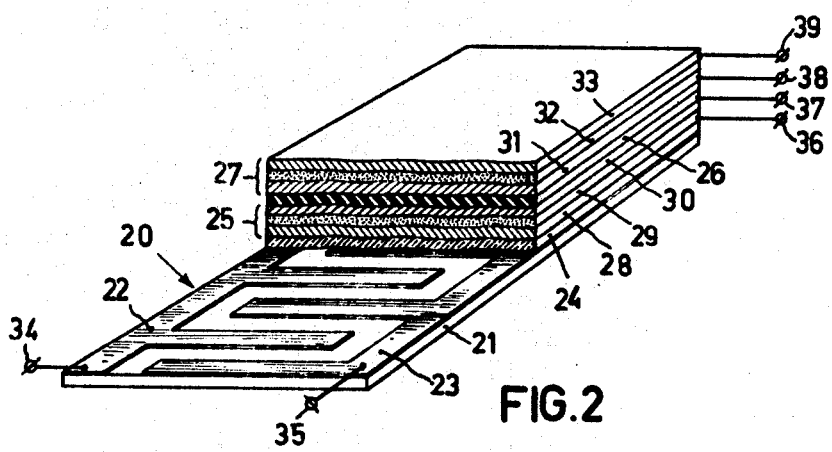
FIG. 2 is a partly developed structure of a photo-conductive element and two electro-luminescent elements.

FIG. 2 shows a partially developed sturcture of one photo-conductive element and two electro-luminescent elements for use in an electro-optical device according to the invention. The thicknesses of the layers are not shown on the correct scale. The photo-conductive element 20 consists of a plate of sintered cadmium sulphide powder 21, which is activated by copper and co-activated by chlorine. On the top side the plate is provided with an interdigital line electrode system, which consists of two comb-shaped electrodes 22 and 23. On the said side of the element 20 are provided, in order of succession, a transparent, insulating layer 24 of glass, an electro-luminescent element 25, an insulating, transparent plastic foil 26 and an electro-luminescent element 27. The electro-luminescent element 25 consists of transparent, conductive layers 28 and 30 of suitably activated tin oxide and an intermediate, electro-luminescent layer 28 containing zinc sulphide activated by copper and co-activated by aluminum. The electro-luminescent element 27 consists of transparent, conductive layer 31 of suitably activated tin oxide, an electro-luminescent layer 32 containing zinc sulphide activated by copper and co-activated by aluminum and a metal layer 33 of silver paste. The glass layer 24 serves furthermore as a support for the electro-luminescent elements 25 and 27. The electrode 22 is provided with a connection 34, the electrode 23 with a connection 35, the conductive layer 28 with a connection 36, the conductive layer 30 with a connection 37, the conductive layer 31 with a connection 38 and the metal layer 33 with a connection 39.

In assembling the electro-optical device according to the invention a photo-conductive element and two electro-luminescent elements are connected, as a unit, so that the photo-conductive element 20 serves as the photo-conductive element 12 of FIG. 1, the electro-luminescent element 25 serves as the electro-luminescent element 15 of FIG. 1 and the electro-luminescent element 27 serves as the electro-luminescent element 11 of FIG. 1, while a second analogous unit is used for the elements 10, 13 and 16, of which the electro-luminescent element 25 serves as the electro-luminescent element 16 and the electro-luminescent element 27 serves as the electro-luminescent element 10. Since the radiation from the electro-luminescent element 27 is absorbed to a greater extent than the radiation of the electro-luminescent element 25, the resistance of the photo-conductive element 20 varies owing to the radiation from the electro-luminescent element 25 to a greater extent than owing to the radiation from the element 27, which corresponds to the analogous element 10 of the second unit.

Figures 3, 4, 5:
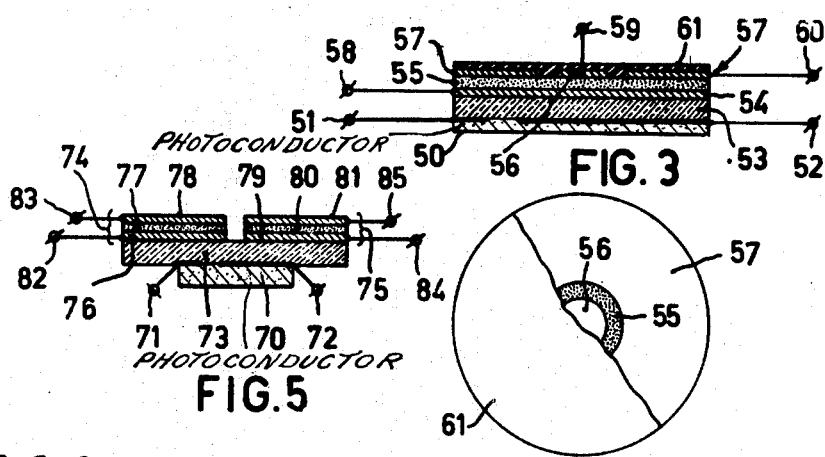
FIG. 3 shows diagrammatically a sectional view of the structure of one photo-conductive element and two electro-luminescent elements.
FIG. 4 is a plan view of the structure shown in FIG. 3.
FIG. 5 shows diagrammatically a sectional view of a structure of a photo-conductive element and two electro-luminescent elements.

FIG. 3 shows diagrammatically, in a sectional view, the structure of one photo-conductive element and two electro-luminescent elements for use in an electro-optical device according to the invention. The thicknesses of the layers are not indicated in the correct size. The photo-conductive element 50 consists of a plate of sintered cadmium sulphide powder, activated with copper and co-activated with gallium and of an interdigital line electrode system provided with connections 51 and 52. On this side of the element are provided, in order of succession, a glass plate 53, which serves at the same time as a support, a transparent, conductive layer 54 consisting of suitably activated tin oxide and an electro-luminescent layer 55, which contains zinc sulphide activated with copper and co-activated with aluminum. Thereon are provided two separated, conductive layers consisting of silver paste: a circular layer 56 and an annular layer 57. The sizes of these layers are such that the surface of the circular layer 56 is smaller than the surface of the annular layer 57. For protection purposes the structure comprises furthermore an enamel layer 61. The conductive layer 54 is provided with a connection 58, the conductive layer 56 with a connection 59 and the conductive layer 57 with a connection 60. The conductive layer 54, the electro-luminescent layer 55 and the conductive layer 56 constitute one electro-luminescent element and the conductive layer 54, the electro-luminescent layer 55 and the conductive layer 57 constitute the other electro-luminescent element. The distance between the conductive layers 56 and 57 preferably at least 0.5 mm. The thickness of the glass plate 53 is more particularly such that the radiation from the electro-luminescent elements not only affects the part of the photo-conductive element lying opposite the conductive layer 56 and 57 respectively, but also has its influence beyond the said part. The thickness of the glass plate 53 is therefore preferably at least 2 mms.

The electro-optical device according to the invention is assembled by connecting this unit of one photo-conductive element and two electro-luminescent elements so that the photo-conductive element 50 serves as the photo-conductive element 12 of FIG. 1, the electro-luminescent element with the conductive layer 56 serves as the electro-luminescent element 11 of FIG. 1 and the electro-luminescent element with the conductive layer 57 serves as the electro-luminescent element 15 of FIG. 1, while a second analogous structure is used for the elements 10, 13 and 16. Since the emissive surface of the electro-luminescent element with the conductive layer 57 exceeds the emissive surface of the electro-luminescent element with the conductive layer 56, the resistance of the photo-conductive element 50 varies to a greater extent when a voltage is applied to the connection 60 than when a voltage is applied to the connection 59 corresponding to the second analogous structure.

FIG. 4 shows a plan view of the structure of FIG. 3, from which the enamel layer 61 is partly omitted, so that the electro-luminescent layer 55 and the silver paste layers 56 and 57 are partly visible.

FIG. 5 shows diagrammatically, in a sectional view, a further structure of one photo-conductive element and two electro-luminescent elements for use in an electro-optical device according to the invention. The thicknesses of the layers are not shown in their correct size. The photo-conductive element 70 consists of a plate of sintered cadmium sulphide powder, activated with copper and co-activated with chlorine and of an interdigital line electrode system provided with the connections 71 and 72. On this side of the element is provided a glass plate 73, which serves at the same time as a support. The surface of the plate 73 exceeds that of the photo-conductive element 70. On the glass plate are provided side by side, symmetrically to the photo-conductive element 70, electro-luminescent elements 74 and 75. The element 74 consists of a transparent, conductive layer 76 of suitably activated zinc oxide, the electro-luminescent layer 77 of zinc sulphide activated with copper and co-activated with chlorine, and the metal layer 78 of silver paste. The element 75 consists of a transparent, conductive layer 79 of suitably activated zinc oxide, the electro-luminescent layer 80 of zinc sulphide activated with copper and co-activated with aluminum and the metal layer 81 of silver paste. The conductive layer 76 is provided with a connection 82, the metal layer 78 with a connection 83, the conductive layer 79 with a connection 84 and the metal layer 81 with a connection 85. The distance between the electro-luminescent elements 74 is preferably 2 to 3 mms. The thickness of the glass plate 73 is, in particular, such that electro-luminescent elements 74 and 75 irradiate the same surface of the photo-conductive element 70. The thickness of the glass plate 73 is therefore, preferably, at least 2 mms.

In an electro-optical device according to the invention this structure of one photo-conductive element and two electro-luminescent elements is connected so that the photo-conductive element 70 serves as the photo-conductive element 12 of FIG. 1, the electro-luminescent element 74 serves as the electro-luminescent element 11 of FIG. 1 and the electro-luminescent element 75 serves as the electro-luminescent element 15 of FIG. 1, while a second analogous structure is used for the elements 10, 13 and 16. Since the electro-luminescent element 74 emits blue light and the electro-luminescent element 75 emits red light, while the photo-conductive element 70 is more sensitive to red than to blue, the resistance of the photo-conductive element 70 varies to a greater extent owing to the radiation from the element 75 than does the resistance of the photo-conductive element of the second structure owing to the radiation from the element 74 corresponding thereto in the second analogous structure.

Figure 6:
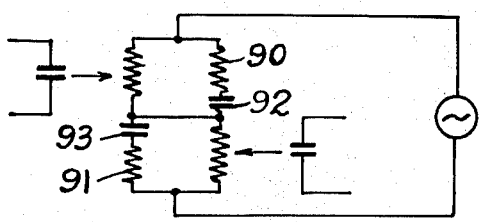
FIG. 6 shows diagrammatically a special electro-optical flipflop arrangement according to the invention.

FIGURE 6 shows an embodiment which is substantially the same as that of FIGURE 1 but comprises the two resistances 90 and 91 in series with the radiation elements 92 and 93 which are the equivalents of the elements 10 and 11 respectively of FIGURE 1.

What I claim is:

1. An electro-optical, bistable arrangement comprising a first voltage-responsive radiation element and a first radiation-responsive photoconductive element connected in parallel to form a first parallel combination, a second voltage-responsive radiation element and a second radiation-responsive photoconductive element connected in parallel to form a second parallel combination, a source of voltage, means connecting the first and second parallel combinations in series with the voltage source, said first radiation element being optically coupled to said second photoconductive element, said second radiation element being optically coupled to said first photoconductive element, a third voltage-responsive radiation element optically coupled to said first photoconductive element, means for applying to the third radiation element a voltage of substantially the same frequency and magnitude appearing across the first radiation element, and means for rendering the optical coupling between the first radiation element and the second photoconductive element significantly less effective than the optical coupling between the third radiation element and the first photoconductive element, whereby, with the same voltage operative to cause radiation generation from the third and first radiation elements, the radiation from the third radiation element reaching the first photoconductive element causes a greater reduction in resistance thereof than the radiation from the first radiation element reaching the second photoconductive element thereby effecting faster switching of the bistable arrangement.

2. An arrangement as set forth in claim 1, comprising a fourth voltage-responsive radiation element optically coupled to said second photoconductive element, means for applying to the fourth radiation element a voltage of substantially the same frequency and magnitude appearing across the second radiation element, and means rendering the optical coupling between the second radiation element and the first photoconductive element significantly less effective than the optical coupling between the fourth radiation element and the second photoconductive element, whereby, with the same voltage operative to cause radiation generation from the fourth and second radiation elements, the radiation from the fourth radiation element reaching the second photoconductive element causes a greater reduction in resistance than the radiation from the second radiation element reaching the first photoconductive element thereby effecting faster switching of the bistable arrangement.

3. An electro-optical, bistable arrangement comprising a first voltage-responsive radiation element and a first radiation-responsive photoconductive element connected in parallel to form a first parallel combination, a second voltage-responsive radiation element and a second radiation-responsive photoconductive element connected in parallel to form a second parallel combination, a source of voltage, means connecting the first and second parallel combinations in series with the voltage source, said first radiation element being optically coupled to said second photoconductive element, said second radiation element being optically coupled to said first photoconductive element, third and fourth voltage-responsive radiation elements optically coupled to said first and second photoconductive element, respectively, the radiating surface areas of the first and second radiation elements being significantly smaller than that of the third and fourth radiation elements, respectively, and means for applying to the third and fourth radiation elements voltages of substantially the same frequency and magnitude appearing across the first and second radiation elements, respectively, whereby, with the same voltage operative to cause radiation generation from the third and first radiation elements, and from the fourth and second radiation elements, respectively, the greater radiation from the third and fourth radiation elements reaching the first and second photoconductive elements, respectively, causes a greater reduction in resistance than the radiation from the first and second radiation elements reaching the second and first photoconductive elements, respectively, thereby effecting faster switching of the bistable arrangement.

4. An electro-optical, bistable arrangement comprising a first voltage-responsive radiation element and a first radiation-responsive photoconductive element connected in parallel to form a first parallel combination, a second voltage-responsive radiation element and a second radiation-responsive photoconductive element connected in parallel to form a second parallel combination, a source of voltage, means connecting the first and second parallel combinations in series with the voltage source, said first radiation element being optically coupled to said second photoconductive element, said second radiation element being optically coupled to said first photoconductive element, third and fourth voltage-responsive radiation elements optically coupled to said first and second photoconductive element, respectively, partial radiation absorbing means between the first radiation element and the second photoconductive element, and between the second radiation element and the first photoconductive element, and means for applying to the third and fourth radiation elements voltages of substantially the same frequency and magnitude appearing across the first and second radiation elements, respectively, whereby, with the same voltage operative to cause radiation generation from the third and first radiation elements, and from the fourth and second radiation elements, respectively, the greater radiation from the third and fourth radiation elements reaching the first and second photoconductive elements, respectively, causes a greater reduction in resistance thereof than the reduced radiation due to the absorbing means from the first and second radiation elements, respectively, causes in the second and first photoconductive elements, respectively, thereby effecting faster switching of the bistable arrangement.

5. An arrangement as set forth in claim 4 constructed of two analogous units wherein the third and fourth radiation elements are interposed between the second and first radiation elements, respectively, and their associated first and second photoconductive elements to constitute the radiation absorbing means.

6. An electro-optical, bistable arrangement comprising a first voltage-responsive radiation element exhibiting a first emission spectrum and a first radiation-responsive photoconductive element connected in parallel to form a first parallel combination, a second voltage-responsive radiation element exhibiting a second emission spectrum and a second radiation-responsive photoconductive element connected in parallel to form a second parallel combination, a source of voltage, means connecting the first and second parallel combinations in series with the voltage source, said first radiation element being optically coupled to said second photoconductive element, said second radiation element being optically coupled to said first photoconductive element, and third and fourth voltage-responsive radiation elements optically coupled to said first and second photoconductive elements, respectively, the emission spectra of said third and fourth radiation elements being significantly different from said first and second emission spectra, respectively, and said first and second photoconductive elements exhibiting greater sensitivity to the emission spectra of said third and fourth radiation elements, respectively, than they exhibit to said second and first radiation elements, respectively, and means for applying to the third and fourth radiation elements voltages of substantially the same frequency and magnitude appearing across the first and second radiation elements, respectively, whereby, with the same voltage operative to cause radiation generation from the third and first radiation elements, and from the fourth and second radiation elements, respectively, the radiation from the third and fourth radiation elements reaching the first and second photoconductive elements, respectively, causes a greater reduction in resistance thereof than the radiation from the first and second radiation elements, respectively, reaching the second and first photoconductive elements, respectively, thereby effecting faster switching of the bistable arrangement.

7. An electro-optical, bistable arrangement comprising a first resistance connected in series with a first voltage-responsive radiation element and the latter in parallel with a first radiation-responsive photoconductive element to form a first parallel combination, a second resistance connected in series with a second voltage-responsive radiation element and the latter in parallel with a second radiation-responsive photoconductive element to form a second parallel combination, a source of voltage, means connecting the first and second parallel combinations in series with the voltage source, said first radiation element being optically coupled to said second photoconductive element, said second radiation element being optically coupled with said first photoconductive element, and third and fourth radiation elements optically coupled to said first and second photoconductive elements, respectively, means for applying to the third and fourth radiation elements voltages of substantially the same frequency and magnitude appearing across the serially-connected first resistance and first radiation element and serially-connected second resistance and second radiation element, respectively, whereby, with the same voltages operative, the greater radiation from the third and fourth radiation elements reaching the first and second photoconductive elements, respectively, causes a greater reduction in resistance than the radiation from the first and second radiation elements, respectively, causes in the second and first photoconductive elements, respectively thereby effecting faster switching of the bistable arrangement.

References Cited by the Examiner

UNITED STATES PATENTS

| | | | |
|---|---|---|---|
| 2,914,679 | 11/1959 | Loebner | 250—213 |
| 2,949,538 | 4/1960 | Tomlinson | 250—213 X |
| 2,964,638 | 12/1960 | Hanlet | 250—213 |
| 2,997,596 | 8/1961 | Vise | 250—213 X |
| 2,999,165 | 9/1961 | Lieb | 250—213 |
| 3,020,410 | 2/1962 | Bowerman | 250—213 X |
| 3,050,633 | 8/1962 | Loebner | 250—213 X |
| 3,058,002 | 10/1962 | Sihvoner | 250—213 X |
| 3,087,068 | 4/1963 | Bowerman | 250—213 |

OTHER REFERENCES

Loebner: "A Trace Integrating Storage Light Amplifier Panel," RCA Technical Notes, November 1959.

RALPH G. NILSON, *Primary Examiner.*

WALTER STOLWEIN, FREDERICK M. STRADER,
*Examiners.*